United States Patent [19]

Jones, Jr.

[11] 4,142,884
[45] Mar. 6, 1979

[54] FLUID COOLING OF GLASS MOLDS

[75] Inventor: Millard L. Jones, Jr., Toledo, Ohio

[73] Assignee: Owens-Illinois, Inc., Toledo, Ohio

[21] Appl. No.: 864,572

[22] Filed: Dec. 27, 1977

[51] Int. Cl.$^2$ .............................................. C03B 9/38
[52] U.S. Cl. ......................................... 65/356; 65/17;
65/319; 65/265
[58] Field of Search ................ 65/265, 319, 355, 356, 65/17

[56] References Cited

U.S. PATENT DOCUMENTS

| 3,171,731 | 3/1965 | Barger et al. ..................... 65/356 X |
| 3,849,101 | 11/1974 | Wythe et al. ..................... 65/356 X |
| 3,887,350 | 6/1975 | Jenkins ............................. 65/356 X |
| 4,009,017 | 2/1977 | Jones ................................. 65/162 |

Primary Examiner—Arthur D. Kellogg
Attorney, Agent, or Firm—D. T. Innis; Myron E. Click; David H. Wilson

[57] ABSTRACT

The cooling of glass forming molds is accomplished by providing a plurality of radially spaced passages either in the mold itself or in a mold holder in good heat transfer relationship to a mold insert. The passages extend vertically and may either be completely through the mold or may extend substantially to the lower end of the mold. These passages are radially insulated by the compaction of a particulate material such as 316-L Stainless Steel Compacting Powder, with the compressed material being carefully packed within the passage and in surrounding relationship to a coaxially positioned metal tube. The metal tube provides access for the circulation of a liquid coolant. The thickness of the particular material, its degree of compression and its composition and the relative position thereof with respect to cavities of the glass forming mold, will determine the heat flow characteristics of the mold and/or mold holder. Proper selection of the parameters involved results in the desired temperature at the molding surface of the mold.

29 Claims, 7 Drawing Figures

FLUID COOLING OF GLASS MOLDS

BACKGROUND OF THE INVENTION

In most cases where it is desired to cool glass forming molds, it has been the practice in the past to accomplish this cooling by the use of compressed air. The compressed air, when in turbulent flow contacts the backs of the molds at high velocity that is sufficient, will carry away a considerable amount of heat and effect a controlled heat transfer from the molds. In the glass bottle forming operation, a charge of glass is first fed, usually by gravity, to a parison mold or a blank mold, as they are sometimes termed, where the glass charge is given a preliminary shape known as a "parison". It is not the purpose of the parison mold to extract heat from the parison to any great extent because the parison must be sufficiently plastic so that it may be expanded by compressed air within a blow mold or final shape mold. The blow mold, however, is intended to impart the final shape to the glass container or article and also to remove sufficient heat from the article so that the formed bottle or container may then be placed, bottom down, on a cooling dead plate without deformation and then be processed through the annealing, inspecting and packing systems. This generally describes the cycle of operation of the well-known IS type glass forming machine. Because the residence time of the glass within the parison mold is considerably less than the residence time within the blow mold, a greater amount of heat will need to be removed from the blow mold, although both molds are cooled at the present time.

The problem of heat removal has become particularly acute in glass container manufacture because a limitation on the speeds of production has been caused by the inability of low pressure air to sufficiently cool the forming molds. Low pressure air that is used requires large volume capacity, relatively high velocity and results in a generation of objectionable noise levels in the forming area. Elimination of noise is a primary advantage of the present invention.

More recently, attempts have been made with some success to cool glass forming molds with liquids such as water. An example of such a successful water-cooled mold system is disclosed in U.S. Pat. No. 3,887,350 to Charles W. Jenkins dated June 3, 1975. In this patent there is disclosed the water-cooling of a mold insert holder with a combination asbestos and graphite sleeve interposed between the holder and the mold insert. Each mold unit is made up of three major parts, a mold insert portion which has a cavity therein, a partial heat transfer barrier sleeve and a water-cooled insert holder. These three elements are assembled together as a composite unit. It is important in the cooling of glass forming molds that heat not be extracted too rapidly or in an uncontrolled manner because if the forming surface of the mold is too cold, it can create checks in the finished container or uneven cooling can result in thick areas that are not desirable. With the use of an insulating sleeve, as shown in this patent, a more uniform temperature distribution has been obtained at the molding surface.

Another mold cooling system is described in U.S. Pat. No. 4,009,017 issued Feb. 22, 1977 to Stanley P. Jones. In this particular patent, the mold hanger is disclosed as containing a bed of particulate material such as iron shot with a system for fluidizing this bed of iron shot and in conjunction with this arrangement, a liquid system of effecting a cooling of the iron shot. The fluidized bed is disclosed as being capable of relatively high heat transfer characteristics, with the bed being fairly insulative when not fluidized.

Commonly assigned U.S. Pat. No. 3,887,350, referred to above, that discloses a glass forming mold for controllably removing heat wherein a thermally insulated layer is interposed between the glass forming surface and the coolant supply, discloses several materials for this insulated layer although asbestos fabric is disclosed as being the preferred material. The present invention is considered an improvement over U.S. Pat. No. 3,887,350 in that it provides an improved barrier material and method of construction which may be readily fabricated to provide the desired degree of heat insulated properties in a controllable and reproducible manner.

Applicant has determined that as a means of avoiding variations in thermal conductivity of existing materials that may be used in sheet form and to provide a system that is less sensitive to assembly techniques for making water-cooled mold units in the manner taught by the above-discussed prior art, the use of compacted particulates offers an attractive concept. When considering the selection of particulates for their heat conductivity properties, the form of the particulates as well as their compositions were explored. Several significant factors emerged, and the configuration of the structure for utilizing the particulates as a heat transfer barrier of reproducible character was given consideration.

It was determined that a heat transfer tube would be a configuration that would lend itself to fairly standard reproduction when considering selecting powders and compaction pressure to achieve a specific heat removal from a forming cavity. Compressed powder heat transfer tubes can be made from a wide variety of powdered material. Metals, graphite, sand and various inorganic materials were successfully used. Tubes ranging in thermal conductivities from 0.1 for diatomaceous earth to 38 Btu/ft.hr.° F. for graphite will give heat transfer coefficients of from 16 to 325 Btu/ft.$^2$hr.° F.

When dealing with powdered, particulate material, as a medium for use in conjunction with molds with high heat loads, medium to high conductivity systems have been achieved using aluminum or graphite powder, added to stainless steel or nickel powder. These combinations, in varying amounts have given excellent results for thermal conductivities in the range of 0.5 to 8 Btu/ft.hr.° F. Low conductivity systems have been achieved using graphite powder, added to diatomaceous earth, for thermal conductivities from 0.1 to 0.7 Btu/ft.hr.° F.

The configuration of heat transfer tubes is considered to possess several advantages over a flat plate insulator, in ease of manufacture, and reproducibility. The testing of the powder thermal conductivity can be done on large batches of powder and either the compaction pressure or composition of the powder can be adjusted to effect a precisely desired thermal conductivity. Furthermore, there is no requirement that machining of mold parts will be critical for the mold cooling system using tubes to give preselected results.

The present invention may be further understood by the explanation of the following examples which relate specifically to the techniques and processes used for producing powdered metal heat transfer tubes in a test apparatus. The test apparatus and the cooling system will closely parallel the functional operation of the invention as applied to a glass forming mold or holder. The test apparatus took the form of metallic test block in which a ½" diameter, vertical hole or passage was drilled therethrough in the manner shown in FIGS. 3 and 5. A ¼" diameter tube of stainless steel was positioned coaxially within the passage thus forming an annulus. This annulus was then filled with powdered metal such as −100 mesh, 316LSS powder. 316LSS powder is a stainless steel powder obtained from Glidden; however, it is a product that may be obtained from other sources. This stainless steel powder was compressed in 1cc increments using a die which fit the annulus with a compressing pressure of 30,000 psi.

The block assembly was then installed in an insulated chamber and heated electrically while cooling water flowed through the inner tube. The data presented in Table I, below, was obtained over a period of several hours, as indicated, with the explanation of the asterisks (*) being found at the bottom of the table. This data revealed the heat transfer property of the tube and demonstrates the anticipated performance of the concept of the invention when applied to the use of a plurality of tubes in surrounding relationship to a glass forming mold. The essentially constant value of $k_p$ obtained after the first two readings was: $k_p = 1.181$, which is taken as the final value.

TABLE I

TYPICAL MEASUREMENT OF HEAT TRANSFER TUBE PERFORMANCE

Material: 316L Stainless Steel, -100 mesh, packed in 1cc increments at 30,000 psi.
Tube: .25" SS316 tube in a .50" diameter hole.

| Time | $U_o$ Btu/ft² hr° F | $k_p$ Btu/ft hr° F |
|---|---|---|
| 9:15 | 71.5 | 1.400 |
| 9:20 | 71.8 | 1.405 |
| * | | |
| 9:35 | 63.1 | 1.186 |
| | 62.9 | 1.182 |
| * | | |
| | 63.0 | 1.183 |
| | 63.1 | 1.187 |
| ** | | |
| 10:40 | 62.3 | 1.166 |
| 10:45 | 62.2 | 1.165 |
| * | | |
| 10:55 | 62.5 | 1.172 |
| 10:59 | 62.9 | 1.181 |
| ** | | |
| 11:30 | 63.1 | 1.185 |
| 11:35 | 62.6 | 1.175 |
| * | | |
| 11:42 | 63.3 | 1.191 |
| 11:45 | 63.4 | 1.195 |
| 12:15 | 62.5 | 1.172 |
| 12:20 | 62.7 | 1.176 |
| * | | |
| 12:30 | 63.2 | 1.188 |
| 12:34 | 63.4 | 1.194 |

*thermally shocked by draining water from system for 5 minutes.
**thermally shocked by cooling the block to 180° F, then reheating.

The overall heat transfer coefficient termed $U_o$ is based on the area of the hole drilled within the mold. The use of $U_o$ may be obtained from the following relationship:

$$U_o = \frac{1}{\frac{A_o}{A_i h_i} + \frac{A_o \Delta r_t}{k_t A_t} + \frac{A_o \Delta r_p}{k_p A_p}}$$

where:

$U_o$ is the overall heat transfer coefficient based on the hole diameter (drilled in the mold), Btu/ft² F. hr.

$A_o$ is the surface area of the hole drilled in the mold, ft².

$h_i$ is the water to metal heat transfer coefficient, Btu/ft² F. hr.

$A_i$ is the inside area of the tube (contacted by water), ft².

$k_t$ is the thermal conductivity of the metal tube, Btu/ft²hr.° F./ft.

$A_t$ is the effective heat transfer area of the metal tube, based on the log mean radius, ft².

$\Delta r_t$ is the metal tube thickness, ft.

$k_p$ is the metal powder thermal conductivity, Btu/ft²hr.° F./ft.

$A_p$ is the effective heat transfer area of the powder, ft².

$\Delta r_p$ is the powder thickness, in ft.

In the operation of the test apparatus the quantity $k_p$ was calculated from the following equations:

$$Q = \dot{m} C_p (T_2 - T_1) \quad (1)$$

$$h_i = .023 \left(\frac{D_i G}{\mu}\right)^{.8} \left(\frac{C_p \mu}{k_w}\right)^{\frac{1}{3}} \quad (2)$$

$$U'_o = \frac{Q}{\pi D_o L \left(T_b - \frac{T_1 + T_2}{2}\right)} \quad (3)$$

$$U'_o = \frac{1}{\frac{D_o}{D_i h_i} + \frac{D_o \Delta r_t}{D_t k_t} + \frac{D_o \Delta r_p}{D_p k_p} + \frac{D_o \Delta r_b}{D_b k_b}} \quad (4)$$

where:

$C_p$ heat capacity of water Btu/lb° F.

$D_b$ the log mean diameter of the block metal, between the thermocouples and the drilled hole, ft.

$D_i$ inside diameter of the metal water tube, ft.

$D_o$ diameter of the hole drilled in the block, ft.

$D_p$ log mean diameter of the "powder" insulator, ft.

$U'_o$ is the overall heat transfer coefficient between the block at the thermocouple location and the water, based on the diameter of the hole drilled in the test block.

$D_t$ log mean diameter of the metal water tube, ft.

G mass velocity of water in the tube, lb/ft²hr.

$h_i$ heat transfer coefficient from the water to the tube, Btuft²hr.° F.

$k_b$ thermal conductivity of the metal block, Btu/ft. hr.° F.

$k_p$ thermal conductivity of the "powder" insulator, Btu/ft.hr.° F.

$k_t$ thermal conductivity of the metal tube, Btu/ft.hr.° F.

$k_w$ thermal conductivity of the water, Btu/ft.hr.° F.

L length of the heat transfer area, ft.

m flow rate of water, lb./hr.

$\Delta r_b$ thickness of the metal block between the thermocouples and the hole drilled in the block, ft.

$\Delta r_p$ thickness of the "powder" insulator, ft.

$\Delta r_t$ thickness of the water tube wall, ft.

$T_1$ temperature of water flowing into the heat transfer area, ° F.

$T_2$ temperature of water flowing out of the heat transfer area, ° F.

$T_b$ average temperature of the block, ° F. (measured $\Delta r_b$ outside of the drilled hole).

In considering the possibility of using other metal powders, other materials were selected. The test apparatus described above was used wherein the hole or passage again was 0.50 inches in diameter with a coaxially positioned stainless steel tube having a 0.25 inch outside diameter extending therethrough and the formed annulus being filled with pure aluminum powder. It should be noted that the compacting pressure of 14,400 psi is less than that of the previous example. It can be seen that the conductivity started at a very high value and decreased rapidly. It appeared to be unstable, even increasing once after thermal shocking. Pure nickel also exhibited this behavior, giving erratic values. Neither was considered as having the desired qualities for a successful heat transfer tube.

Further, mixtures of various metal particulates as previously stated, have certain predictable results and metals and refractory oxide mixtures also have been tried. Refractory oxide powder and powdered graphite have had limited success. When considering refractory oxides, it should be understood that inorganic powders, such as talc and the previous described diatomaceous earth are possible candidates for use as the particulates to be used in insulating tubes.

TABLE II
MEASUREMENT OF THE PERFORMANCE OF AN UNSTABLE HEAT TRANSFER TUBE

Material: −60+150 mesh aluminum, packed in 1cc increments, at 14,500 psi.
Tube: .25" OD SS316 tube in a 0.500" hole
Reference: 650° F block temperature; 85° F water.

| Time | $U_o$ $\frac{Btu}{ft^2 \, hr \, °F}$ | k $\frac{Btu}{ft \, hr \, °F}$ |
|---|---|---|
| 4:10pm | 165.0 | 5.809 |
| 4:15 | 166.9 | 5.943 |
| * | | |
| 4:30 | 120.5 | 3.098 |
| 4:35 | 117.0 | 2.945 |
| ** | | |
| next day | 133.1 | 3.706 |
| | 134.7 | 3.803 |
| * | | |
| 11:30am | 112.9 | 2.769 |
| 11:33 | 112.4 | 2.749 |
| ** | | |
| 12:20 | 107.9 | 2.573 |
| 12:22 | 108.4 | 2.593 |
| * | | |
| 12:36 | 97.9 | 2.212 |
| | 98.1 | 2.215 |

*thermal shock by draining water for 5 min.
**thermal shock by cooling 180° F and reheating.

Other metal powders, as well as mixtures of such powders with graphite were considered. Tests with uncompressed copper, 316SS, nickel and aluminum powders were conducted and found to be difficult to repeat since the degree of compression of the powder was found to have a significant effect. Copper and nickel were tested for several samples to determine reproducibility. Copper was less reproducible, possibly because of partial oxidation of copper at the higher temperatures.

In an effort to study the repeatability factor in selecting powders, the previously described test apparatus was used to conduct a series of tests wherein the cooling tube was formed by the identical procedure and the heat flow characteristics were carefully monitored so as to give comparable results. These results are given in Table III below. Again note the compressing force was 6,000 psi, which is a different pressure than used in the prior examples.

TABLE III
REPEATABILITY TEST

Material: −100 mesh, 316L Stainless Steel, compressed in 1cc increments at 6000 psi, ¼" tube in ½" hole. 650° F block temperature; 85° F water temperature
Tube: .25" OD SS316 tube in a .50" hole

| Test | $k_p$ $\frac{Btu}{ft \cdot hr \cdot °F}$ | $U_o$ $\frac{Btu}{ft^2 \cdot hr \cdot °F}$ |
|---|---|---|
| 1 | .563 | 34.8 |
| 2 | .568 | 34.6 |
| 3 | .522 | 32.1 |
| 4 | .559 | 34.1 |
| 5 | .551 | 33.5 |
| 6 | .562 | 34.5 |
| Average | .554 | |
| Std. dev. | 3.0% | |

The effect of the pressure used to compact the powders on the thermal conductivities of 316SS and nickel are shown in Table IV.

TABLE IV
EFFECT OF PRESSURE ON THERMAL CONDUCTIVITY

| Pressure psi | −100 SS 316L $k_p$ | AN100 Nickel $k_p$ |
|---|---|---|
| 10,000 | .521 | 1.03 |
| | .531 | 1.250 |
| | .503 | |
| | .472 | 1.14 avg. ± 13.6% |
| | .507 avg. ± 5.1% | |
| 20,000 | .761 | 1.82 |
| | .929 | 1.818 |
| | .846 | |
| | .845 | 1.819 avg. ± .08% |
| | .844 | |
| | .845 avg. ± 7.0% | |
| 30,000 | 1.084 | 1.75 |
| | 1.181 | 2.17 |
| | 1.200 | 1.68 |
| | 1.171 | 2.12 |
| | 1.159 avg. ± 4.5% | 1.93 avg. ± 11.8% |
| 40,000 | 1.377 | |

From the foregoing, it can be seen that pressure is a significant factor with regard to the thermal conductivity of the cooling system.

Another factor to consider in the selection of the configuration and parameters to follow in designing a water-cooled mold of the invention for a particular shape of mold is the composition of the particulate used as the compacted layer 16. In addition to pure compositions, consideration has been given to various mixtures of powdered material.

The following Table V gives the comparisons of $k_p$ values for various mixtures of Aluminum and Nickel powders in 316L Stainless Steel, compacted at 30,000 psi in 1cc increments in the previously described test apparatus:

TABLE V

| Wt % | | | $k_p$ |
|---|---|---|---|
| Al | Ni | 316SS | Btu/hr.ft.° F |
| 0 | 0 | 100 | 1.159 |
| 0 | 100 | 0 | 1.93 |
| 100 | 0 | 0 | 3.80 |
| 10 | 0 | 90 | 2.30 |
| 10 | 0 | 90 | 2.31 |
| 25 | 0 | 75 | 3.38–3.68 |
| 25 | 0 | 75 | 3.29–3.46 |
| 10 | 30 | 60 | 2.53 |

The foregoing discussion and explanations are believed to provide a clear understanding of the objects of the present invention.

It, therefore, is an object of this invention to provide a system for cooling glass forming molds which is reproducible to the extent that by using repeatable techniques, the heat transfer characteristics of the molds will be known.

It is a further object of this invention to provide a mold cooling system that is simple in execution and not subject to any complex moving elements that may have unpredictable results.

SUMMARY OF THE INVENTION

In attaining the objects of this invention, one feature resides in a glassware forming mold having a forming surface for shaping molten glass, a conduit for liquid coolant positioned in heat transfer communication with said forming surface, and a thermal insulator positioned in the path of heat transfer communication between said forming surface and said conduit for controlling the flow of heat from said forming surface to said conduit, the improvement wherein said thermal insulator comprises a rigid, porous composite layer of compacted particulates.

Figure 6:
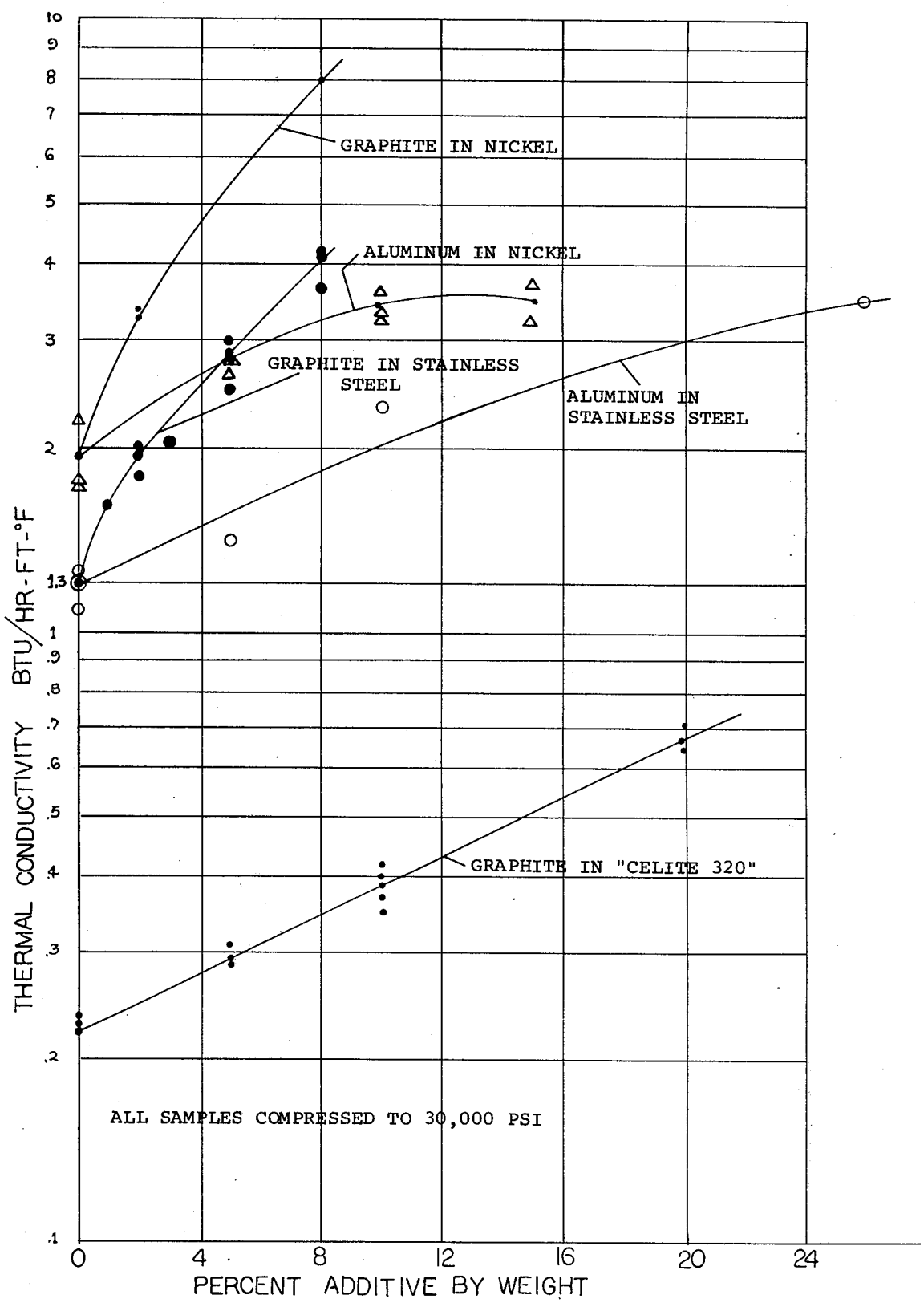
FIG. 6 is a graph showing the relationship of thermal conductivity and composition of various mixtures of powders.
Figure 7:
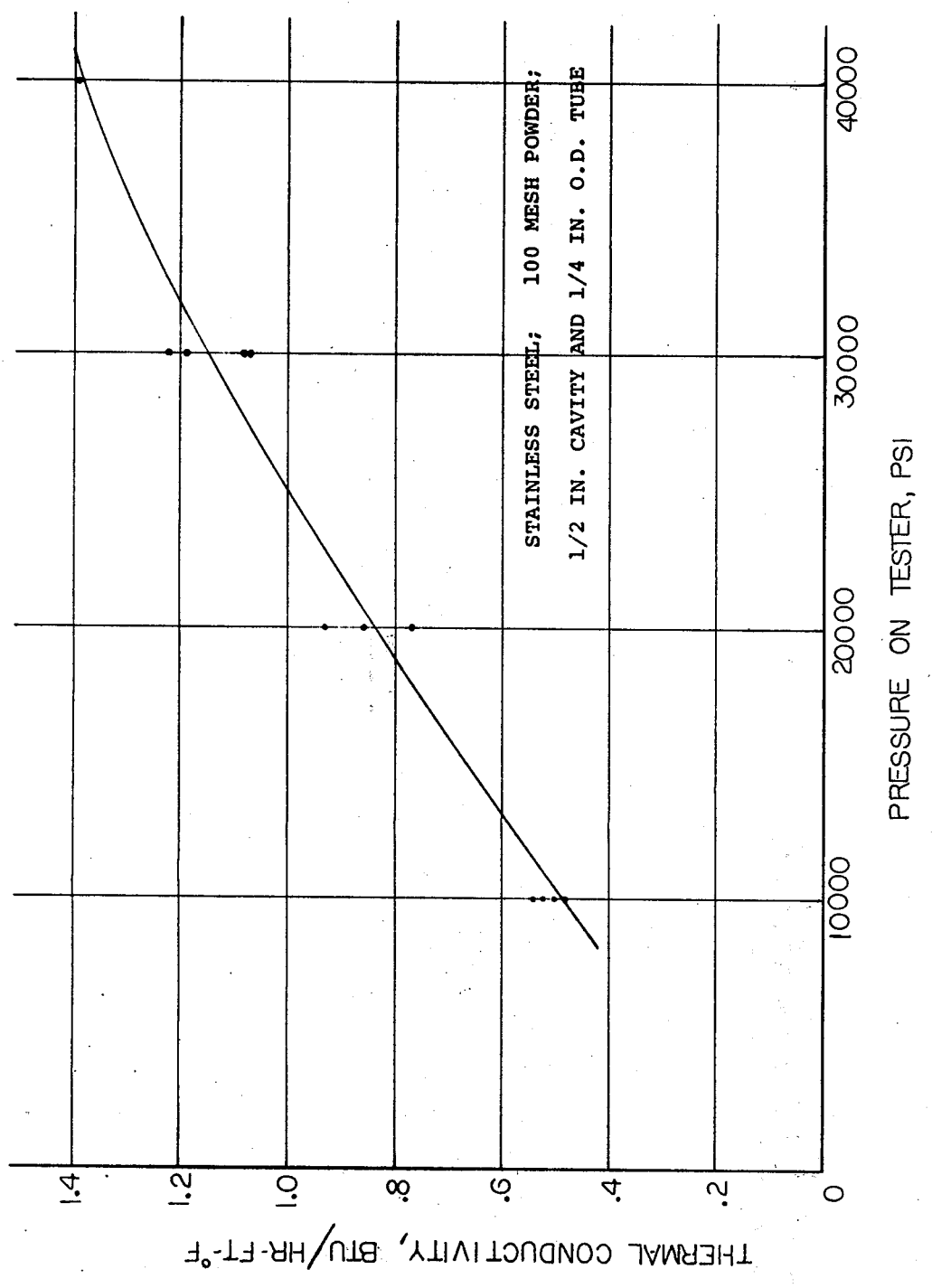
FIG. 7 is a graph showing the relationship of thermal conductivity and compaction pressure.

Having described some of the parameters and considerations involved in the design of compacted powder thermal insulator tubes, reference may be had to FIGS. 6 and 7 which illustrate curves used for designing compressed powder heat transfer tubes. It can readily be seen that heat transfer tubes can be made from a large variety of powders. Metals, graphite, sand and various inorganic materials having been used successfully. The tubes that have actually been produced and tested, range in thermal conductivity from 0.1 for diatomaceous earth to 38 Btu/ft.hr.° F. for graphite, giving heat transfer coefficients of from 16 to 325 Btu/ft.$^2$hr.° F. The actual points indicated on the curves shown in FIG. 6 are the average of several tests carried out in the test apparatus, described above, rather than a single absolute value.

With specific reference to FIG. 6, the preferred systems are graphite in nickel for thermal conductivities in the range of 3-8. In the range of 1.3-3, graphite in −100 mesh stainless steel holds the most promise. In the range of 0.5-1.3, a system of stainless steel in −100 mesh powder at pressures varying from 10,000 to 40,000 psi are considered best and for systems where the thermal conductivity is desired to be in the range of 0.1-0.6, graphite in diatomaceous earth such as Celite 320.

The five curves shown in FIG. 6 illustrate five general examples of mixtures of metal powders of graphite in combination with metal powders and graphite in combination with powdered diatomaceous earth, as explained above. Celite 320, as previously explained, is a diatomaceous earth product of Johns Manville, Inc., having the following properties:
Color: White
Density:
Dry 19.5 lbs. per cubic foot
Wet 20 lbs. per cubic foot
Screen analysis percent retained 150 mesh: 50%
ph: 10
Specific gravity: 2.30
Chemical analysis:
$SiO_2$: 89.6
$Al_2O_3$: 4.0
$Fe_2O_3$: 1.3
$P_2O_5$: 0.2
$TiO_2$: 0.2
$CaO$: 0.5
$MgO$: 0.6
$Na_2O + K_2O$: 3.3

Graphite powder which is mixed with Celite in the example shown in the graphs of FIG. 6, is a commercial graphite powder sold by UCAR, Niagara Falls, New York, under the catalogue designation No. GP BB-5 having a fineness of 50% minimum through a 35 mesh screen, on a 65 mesh screen. Total ash content of the graphite is less than 2%. Screens are standard Tyler.

The procedure followed in making the powdered particulate tube and the testing of the tube in which diatomaceous earth (Celite 320) and graphite were combined is as follows:

Step 1: The required weighted amounts of each material are placed in a large beaker or container.

Step 2: The materials are mixed dry until the mixture appears to be of a uniform color. It should be recalled that the graphite powder is black in color and the diatomaceous earth is white in color.

Step 3: The mixed particulate material is placed in the annulus formed by the hole and concentrically positioned stainless steel pipe of the test apparatus as described above. The material is added in 2cc increments and each increment subjected to 30,000 psi pressure on the annular die.

Step 4: The test unit is heated to 650° F. with water at laboratory temperature (approx. 85°) being circulated through the stainless steel pipe.

Step 5: After the system has reached thermal equilibrium, temperatures are read from thermocouples positioned within the test block at precise locations relative to the hole therein and the temperature of the incoming water and the exiting water are taken.

Step 6: The system is thermally shocked by draining the water from the system for 5 minutes, then starting it again and repeating step 5.

This data is then used to calculate thermal conductivity values in Btu/hr.ft.° F. and the average of several tests measured after results are consistent under the identical conditions of the steps set forth above were used to plot a single point on the curve labeled "graphite in Celite 320" in FIG. 6, as well as the other four curves shown on FIG. 6 and the curve on FIG. 7.

EXAMPLE 1

In this example, the six steps set forth above were followed with the weight percent of graphite additive being 20%. The result was an average value of k of 0.675 Btu/hr.ft.° F.

EXAMPLE 2

Same procedure and ingredients as Example 1, with the 10% by wt. graphite added to the diatomaceous earth. An average value of 0.385 was obtained.

EXAMPLE 3

Same procedure and ingredients as in Examples 1 and 2, with 5% by wt. graphite mixed with diatomaceous earth. An average value of 0.295 was obtained.

EXAMPLE 4

Same procedure as set forth in Examples 1–3, with the exception that no graphite was added to the diatomaceous earth. An average value of 0.240 was obtained. FIG. 6 shows a plot of percent additive against thermal conductivity for Examples 1–4 designated "Graphite in Celite 320".

EXAMPLE 5

Same procedure as set forth in Example 1, except the ingredients are changed to −100 mesh aluminum powder added to −100 mesh stainless steel powder. The powdered aluminum is 26% by weight and the average value of k was 3.5 Btu/hr.ft.° F.

EXAMPLE 6

Same procedure and ingredients as set forth in Example 5, except the aluminum had the weight percent of 10% and the average value of k was 2.3 Btu/hr.ft.° F.

EXAMPLE 7

Same procedure and ingredients as set forth in Example 6, except the aluminum additive was 5% by weight and the average value of k was 1.8 Btu/hr.ft.° F.

EXAMPLE 8

Same procedure as set forth in Example 5, with the exception that no aluminum was added to the stainless steel and an average value of k was 1.2 Btu/hr.ft.° F. The results of Examples 5–8 are plotted on FIG. 6 and designated "Aluminum in Stainless Steel".

EXAMPLE 9

The same procedure of Steps 1–6 set forth above were followed, except that graphite powder was used as an additive to −100 mesh stainless steel powder. The powdered graphite had a weight percent of 8% and the average k value obtained was 4.1 Btu/hr.ft.° F.

EXAMPLE 10

The same procedure and ingredients as set forth in Example 9, except the weight percent of graphite additive was 5% and the average k value obtained was 2.9 Btu/hr.ft.° F.

EXAMPLE 11

Same procedure and ingredients as set forth in Example 9, except the weight percent of graphite was 2% and the average k value obtained was 1.9 Btu/hr.ft.° F.

EXAMPLE 12

Same procedure and ingredients as set forth in Example 9, except the weight percent of graphite additive was 1% and the average k value obtained was 1.6 Btu/hr.ft.° F. The results obtained for Examples 8–12 were plotted on FIG. 6 and designated "Graphite in Stainless Steel".

EXAMPLE 13

Same procedure as set forth in Example 5, with nickel used as the continuous medium instead of stainless steel. The aluminum additive was in the weight percent of 15% and the average k value obtained was 3.5 Btu/hr.ft.° F.

EXAMPLE 14

Same procedure and ingredients as set forth in Example 13, except that the weight percent of aluminum was 10% and the average k value obtained was 3.4 Btu/hr.ft.° F.

EXAMPLE 15

Same procedure and ingredients as set forth in Example 13, except that the weight percent of aluminum was 5% and the average value of k that was obtained was 2.8 Btu/hr.ft.° F.

EXAMPLE 16

Same procedure as set forth in Example 13, except no aluminum was added and the average k value obtained for pure nickel was 1.93 Btu/hr.ft.° F. A plot of Examples 13–16 is shown on FIG. 6 and is designated "Aluminum in Nickel".

EXAMPLE 17

Same procedure as set forth in Example 13, with graphite powder as the additive to the nickel powder. The graphite being the same grade and fineness as used in prior examples. The graphite was in a weight percent of 8% and the average k value obtained was 8 Btu/hr.ft.° F.

EXAMPLE 18

Same procedure and ingredients as set forth in Example 17, except the weight percent of graphite was 2% and the average k value obtained was 3.3 Btu/hr.ft.° F. The results obtained for k values for Examples 16–18 were plotted on FIG. 6 and designated "Graphite in Nickel".

The data set forth in Table IV above under the heading of −100 mesh SS316L Stainless Steel was used to plot the curve shown in FIG. 7. Here again the k values at the pressure level of 10,000 psi to 40,000 psi used to make the curve in FIG. 7 are average values obtained from several actual test runs where the powder was made into tubes and the tubes tested by the procedure set forth above in Steps 2–6. Rather than enumerate each test run as a separate example, it is believed clear and adequate to merely state that FIG. 7 is a graphic representation of a portion of the data found in Table IV.

As can be seen from FIG. 6, aluminum or graphite powder added to 316 stainless steel or nickel powder, are excellent for thermal conductivities in the range of from 1.3 to 8 Btu/ft.hr.° F. In considering the range from 0.1 to 8 Btu/ft.hr.° F., thermal conductivity, the lower curve in FIG. 6 shows the range that would be partially covered by diatomaceous earth and graphite mixtures, with the diatomaceous earth being the continuous phase and the graphite being the additive. The thermal conductivity range for this material is approximately 0.2 to 0.7. Other grades of diatomaceous earth may be used to give thermal conductivities as low as 0.1 Btu/ft.hr.° F.

FIG. 7 illustrates how to achieve selected thermal conductivities from between 0.5 and 1.3 Btu/ft.hr.° F., by varying the pressure used in compacting the stainless steel powder. For the range from 1.3 to 3 Btu/ft.hr.° F., a mixture of 316 stainless steel and graphite may be used in accordance with the curve of FIG. 6. Additionally, nickel, with graphite as an additive, will supply thermal conductivities in the range of 3-8 Btu/ft.hr.° F.

While the powdered material may be selected depending upon the thermal conductivity desired, and may be mixtures of various metals and/or graphite, it should be kept in mind that for most applications, thermal conductivities between 0.1 and 38 Btu/ft.hr.° F. will span the most useful ranges in glass forming molds and with this in mind, it is very possible that diatomaceous earth and graphite mixtures will provide the full range of thermal conductivities desired. A look at FIG. 6 indicates that there must be an area where $k_p$ changes so rapidly with compositions that reproducibility will suffer.

It is also desirable, from a practical point of view, to have all tubes made with the same compaction pressure to avoid complicating the instructions for carrying out the invention in the environment of a glass container forming plant.

In addition to the above described Examples where specified materials were used as the particulate medium, other materials were also tried and tested.

While these other materials are not preferred for various reasons, the following Table VI is given in the interest of providing complete information. The right-hand column of the Table is a brief explanation of why the material is not one of those preferred.

TABLE VI

MISCELLANEOUS COMPRESSED POWDER TUBES

| Material (Chronologically) | Range of Thermal Conductivity | Status |
| --- | --- | --- |
| Aluminum Powder | .4 14 2.2 | Unstable tubes |
| Steel Wool | 1.8 | Difficult to pack |
| 316 Stainless Steel Wool | .6 | Difficult to pack |
| 60% SS-20% N; 10% A-1 | 2.52 | Thermal conductivity range incl. in other materials. |
| Graphite | 38.6 | Too high thermal conductivity. |
| Talc | 1.54 | Difficult to pack, covered by SS |
| Sand | .43 | No advantage over preferred materials. |
| Fired Ceramic | .170 | " |
| Castable Resin | .30-.34 | " |
| Poured Castable Resin (Cement) | — | Failed |
| Various Diatomaceous Earth-Graphite | .10-.64 | Discarded in favor of better grades. |

In the present invention and encompassing all embodiments, powdered material is compacted within a passage formed in the mold or mold holder and, as stated above, the manner in which the powder is compacted in an annular chamber formed between the passage wall and a central tube or pipe, will have significant effect on the thermal conductivity of the mold unit. In this regard, the compaction process of the present invention is similar to the compaction process used in powder metallurgy technology, although no sintering operation is employed in the present invention since this would have the effect of consolidating the compact and increasing the thermal conductivity characteristics beyond that desired. In this regard, the compaction process of the present invention includes compressing the powder in a shaped die with a ram press to produce a type known in powder metallurgy terminology as "a green compact".

Figure 1:
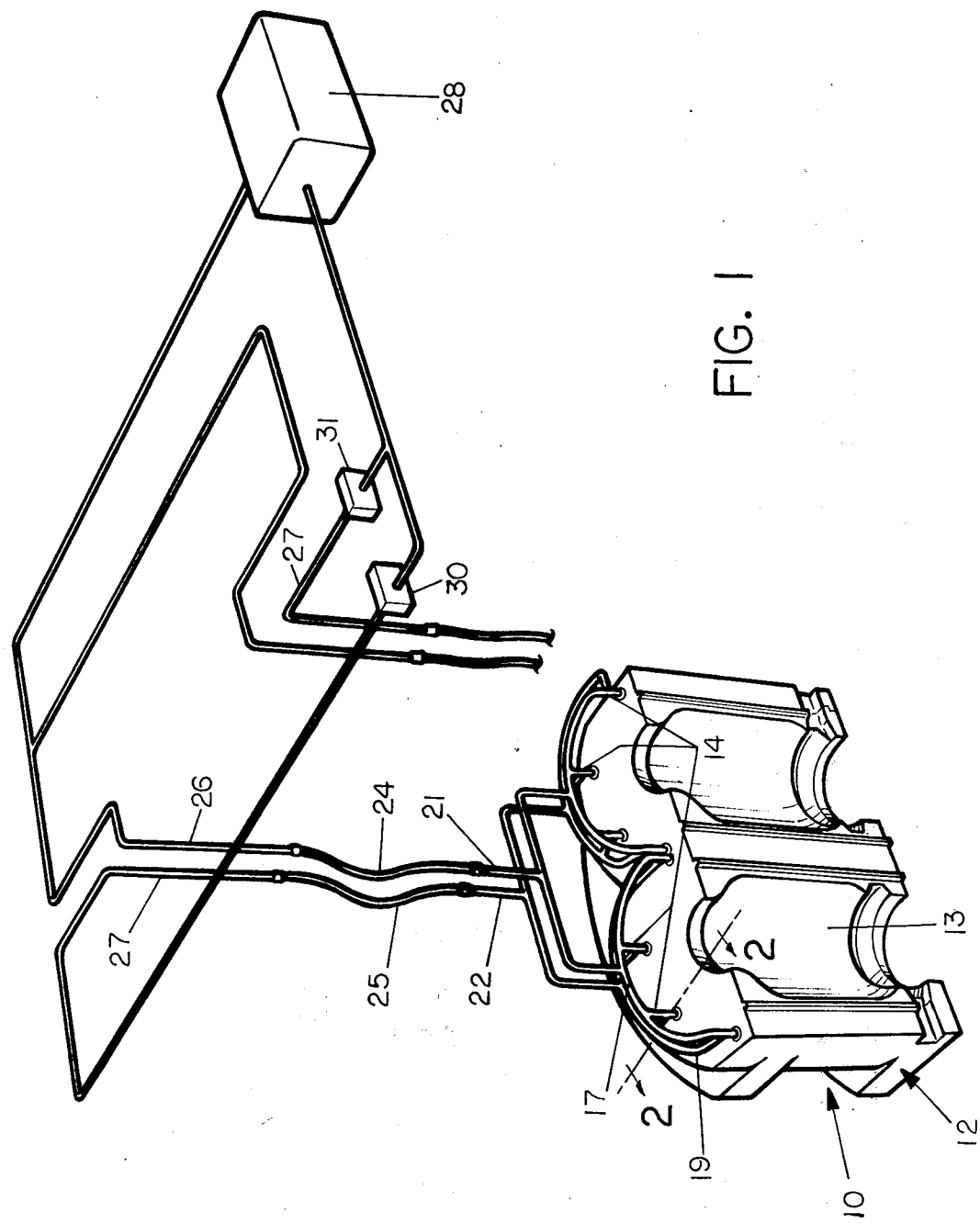
FIG. 1 is a perspective view of the preferred embodiment of the cooling system of the invention.

Referring now to FIG. 1 reference numeral 10 generally illustrates glass forming mold assembly which is constructed of iron, steel or other materials conventional in the glass forming art. The mold assembly 10 is shown as comprised of a glass forming mold 12. The glass forming mold 12 is formed with a cavity therein having a polished, shape-determining surface 13, which, in combination with a complementary mold half, will form the cavity having the shape of the bottle being formed.

The mold assembly is of the type generally designated a double cavity mold assembly and is of split mold construction. The complete mold assembly will include another mold half for each cavity which is identical with the mold half illustrated in FIG. 1.

The glass forming mold 12 is provided with a plurality of liquid coolant conduits 14 which are inserted into vertical passages 15 therein. As shown in FIG. 1, the mold is provided with two sets of four passages 15, each set corresponding to a separate mold half. Conduits 14, in the form of conventional metal tubing, such as copper tubing for efficient heat transfer, are provided in each passage. Each tube 14 is positioned generally concentrically with respect to the passage 15 and the resulting annulus is filled in the manner previously described, with a compacted powder resulting in an annular, rigid, porous composite layer 16 as can be seen from FIG. 2 of the drawings. This layer 16 is, therefore, interposed in the path of heat transfer from the glass forming surface 13 to conduit 14. The layer 16 will have a thermal conductivity ($k_p$ value) in the range of about 0.01 to about 10 Btu/ft.hr.° F. and its thickness may be adjustable to provide the desired overall heat transfer coefficient (U). It should be understood that the actual thickness of the layer need not be uniform and, in fact, it may be desirable to have it thicker or thinner in various locations along the profile of the mold to provide differential heat transfer rates for the most efficient formation of the bottle or container shape. For example, the rate of heat transfer from the neck portion or area of the glass forming surface may need to be quite different from the heat transfer rate at the side wall or base of the glass container.

Figure 2:
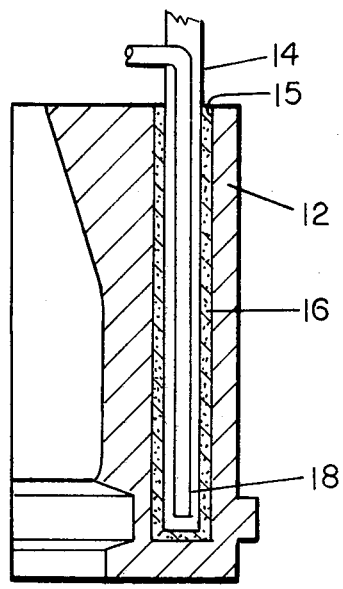
FIG. 2 is a cross-sectional view taken at line 2—2 of FIG. 1.
Figure 4:
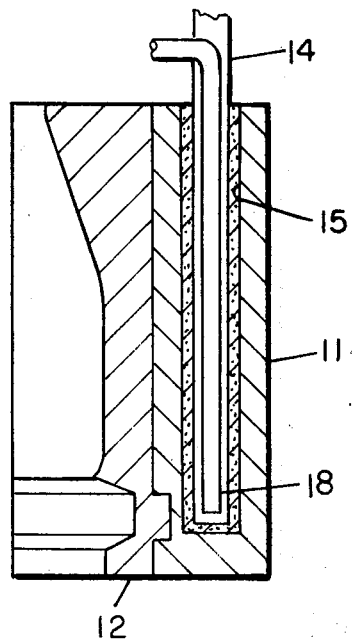
FIG. 4 is a cross-sectional view, similar to FIG. 2, showing a third embodiment of the invention.

As can be seen from FIG. 1, the coolant conduits are manifolded at 17 for the distribution of the cooling water to the molds. A coolant return pipe 18, in the embodiment of FIGS. 1, 2 and 4, is shown extending coaxially through substantially the full length of conduit 14. The return pipes 18 from the plurality of locations are manifolded at 19. Single connections to the manifolds 17 and 19 are designated 21 and 22, respectively, and, in turn, are connected by flexible piping sections 24 and 25 to relatively fixed conduits 26 and 27. The conduits 26 and 27 extend to opposite sides of a coolant pumping and circulation unit 28. In the circulation system illustrated in FIG. 1, the outlet lines 27 from the fluid cooling and pumping unit pass through schematically illustrated, control valves 30 and 31 which serve as a means of controlling the flow rate of the cooling liquid to more precisely control the rate of heat removal from mold halves 10. Control of flow is not an absolute requirement for proper operation of the molds of this type, but it is desirable in order to provide the accuracy or "fine tuning" necessary to achieve the precise heat transfer characteristics as the rates of glass forming are changed or adjusted.

Figure 3:
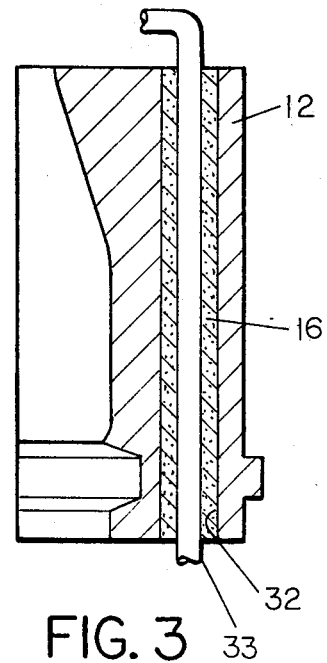
FIG. 3 is a cross-sectional view, similar to FIG. 2, illustrating a second embodiment of the invention.

With particular reference to FIG. 3, an alternative embodiment of the invention may be seen in which the mold 12 is provided with a passageway 32 which extends completely from top to bottom of the mold. Within the passageway 32, a metal tube 33 is positioned coaxially with respect to the passageway and between the metal tube 33 and the wall of the passageway there is provided compacted particulate material 16, as in the case of the embodiment of FIG. 2. In this particular embodiment, water will be circulated through the tube 33, and since the tube 33 may be of substantially the same diameter as that of tube 14 in FIG. 2, the thermal conductivity of the system will essentially be the same as that of FIG. 2. The embodiments of FIGS. 4 and 5 illustrate the invention as applied to the mold holders in that the passageways are formed in the mold holder.

Figure 5:
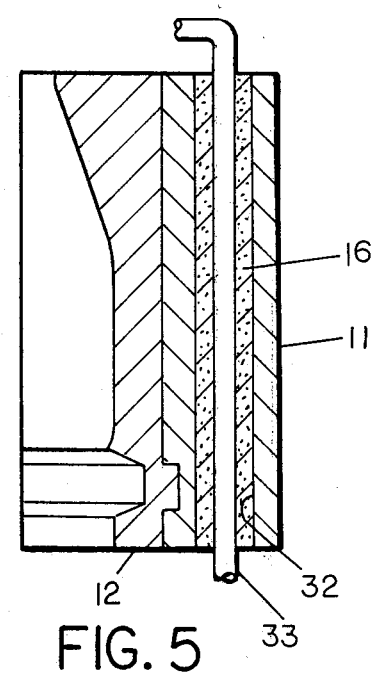
FIG. 5 is likewise a cross-sectional view, similar to FIG. 2, illustrating a fourth embodiment of the invention.

With reference now to FIGS. 4 and 5, it can be seen that the invention, while perhaps not being as preferred, can be executed by providing the cooling tubes in a mold holder 11 rather than in the mold itself. Again, the tubes 14 and 33 which extend into passages formed in the mold holder, will be supplied with water or other suitable liquid coolant for conducting heat away from the molten glass contacting surface 13 of the mold 12.

While the embodiment of FIG. 1 shows four cooling tubes for each mold half, it should be kept in mind that the number of tubes may be greater or less, with the important consideration being that the number of tubes and their placement must be such as to provide relatively uniform or controllably non-uniform cooling to the forming surface 13 in the mold.

The parameters of a mold cooling system such as that shown in FIG. 1, must take into consideration the temperatures that exist in the molds during the normal forming cycle, for example, in forming glass beverage containers.

The particular mold half illustrated in FIGS. 1–5 in normal operation when used to produce a non-return beer bottle will achieve the steady state temperature of between 650° F. and 750° F. at a point immediately behind the forming surface 13.

As can be seen in Table I, the water flowing in the test system which closely parallels the mold situation of FIGS. 3 and 5, the cooling water temperature is increased 12° to 20° F. by the heated mold simulating block.

It should also be kept in mind that while the invention is shown specifically with what are termed "split" molds, there are presently in use, molds which are termed "one-piece" and the principle of this invention can be equally applicable to such "one-piece" molds and/or their holders.

Having thus described the invention, what is claimed is:

1. In a glassware forming mold having a forming surface for shaping molten glass, a conduit for liquid coolant positioned in heat transfer communication with said forming surface, and a thermal insulator positioned in the path of heat transfer communication between said forming surface and said conduit for controlling the flow of heat from said forming surface to said conduit, the improvement wherein said thermal insulator comprises a fixed, rigid, porous composite layer of compacted powders selected from the group consisting of aluminum, stainless steel, nickel, refractory oxides, graphite and diatomaceous earth compacted within the mold structure.

2. The mold of claim 1 wherein said composite layer of compacted powders has a thermal conductivity ($k_p$) value in the range of about 0.01 to about 10 (BTU/ft.$^2$hr.° F./ft.).

3. The mold of claim 2 wherein said composite layer of compacted powders has a thermal conductivity ($k_p$) value in the range of about 0.1 to about 5 (BTU/ft.$^2$hr.° F./ft.).

4. The mold of claim 1 wherein said powders are metal particulates.

5. The mold of claim 1 wherein said powders are a mixture of powdered aluminum and stainless steel.

6. The mold of claim 5 wherein the mixture is in the weight percent range of aluminum 0%–25% and stainless steel 100%–75%.

7. The mold of claim 1 wherein said powders are a mixture of powdered nickel and aluminum.

8. The mold of claim 7 wherein said mixture is in the weight percent range of aluminum 0%–15% and nickel 100%–85%.

9. The mold of claim 1 wherein said powders are refractory oxide particulates.

10. The mold of claim 1 wherein said powders are a mixture of powdered metal and graphite.

11. The mold of claim 10 wherein said mixture is in the weight percent range of metal 100%–92% and graphite 0%–8%.

12. The mold of claim 11 wherein the metal is nickel.

13. The mold of claim 11 wherein the metal is stainless steel.

14. The mold of claim 1 wherein said powders are a mixture of graphite and diatomaceous earth.

15. The mold of claim 14 wherein said powders are in the weight percentage ranges of 0%–24% graphite to 100%–76% diatomaceous earth.

16. In a glassware forming mold having a forming surface for shaping molten glass, a conduit for circulation of cooling water through the mold positioned in heat transfer communication with said forming surface, a thermal insulator positioned in the path of heat transfer communication with said forming surface for controlling the flow of heat from said forming surface to said conduit, the improvement wherein said thermal insulator is a rigid, porous composite layer of compacted metal powder selected from the group consisting of aluminum, stainless steel, nickel, and refractory metal oxides, said layer having a thermal conductivity ($k_p$) value in the range of about 0.1 to about 8 (BTU/ft.$^2$hr.° F./ft.).

17. The mold of claim 16 wherein said composite layer is powdered stainless steel compacted in the range of 10,000 psi to 40,000 psi to give a thermal conductivity in the range of 0.3 to 1.4 BTU/ft.$^2$hr.° F./ft.

18. Apparatus for cooling glass forming molds having a forming cavity comprising:
 a plurality of radially spaced, substantially vertical passages in said mold surrounding the forming cavity and extending substantially the full height thereof;
 an annular, insulating lining within each said passage, said insulating lining being a compacted powder selected from the group consisting of aluminum, stainless steel, nickel, refractory oxides, graphite and diatomaceous earth; and
 an elongated, liquid cooled member, in heat-transfer relationship with said lining.

19. Apparatus for cooling glass forming molds having a glass-contacting surface which is subjected to heat from the glass being formed, comprising:
- a compacted, powder material in heat-transfer relationship to said glass-contacting surface; said powder material being selected from the group consisting of aluminum, stainless steel, nickel, refractory oxides, graphite and diatomaceous earth; and
- means engaging said powder material and holding said material in contact with the forming mold and for removing heat therefrom.

20. The apparatus of claim 19 wherein said heat-removing means engaging said powder material comprises a circulating liquid heat exchanger.

21. The apparatus of claim 19 wherein said heat-removing means engaging said powder material comprises water-cooled pipes extending into said particulate material.

22. The method of forming a liquid cooled mold comprising the steps of:
- providing a plurality of vertical passages in a glass forming mold equidistant from the forming cavity therein;
- coaxially placing a tube of smaller diameter than said passage within said passage;
- compacting a powdered particulate insulating medium selected from the group consisting of aluminum, stainless steel, nickel, refractory oxides, graphite and diatomaceous earth within the annulus formed between the passage and the tube; and
- connecting the tube to a source of liquid coolant.

23. The method of claim 22 wherein the powdered particulate medium is a powdered metal.

24. The method of claim 22 wherein the powdered particulate is a refractory oxide powder.

25. The method of claim 22 wherein the step of compacting a powdered particulate is performed in a series of relatively small volume increments of compacting at pressures in the range of 5,000 to 40,000 psi.

26. The method of claim 22 wherein the powdered particulate medium is a mixture of graphite and diatomaceous earth.

27. The method of claim 22 wherein said passages are formed by vertically drilling into the glass forming mold.

28. The method of forming a liquid cooled glass forming mold system in which a mold is carried in thermal transfer relationship to a holder in generally surrounding relationship to the mold comprising the steps of:
- providing a plurality of generally vertical passages extending at least a substantial distance into the mold holder and equidistant from the mold cavity;
- coaxially placing a tube of smaller diameter than said passage within said passage;
- compacting a powdered particulate insulating medium selected from the group consisting of aluminum, stainless steel, nickel, refractory oxides, graphite and diatomaceous earth within the annulus formed between the passage and the tube; and
- connecting the tube to a source of liquid coolant.

29. The method of claim 28 wherein the powdered particulate medium is a mixture of graphite and diatomaceous earth.

* * * * *